United States Patent [19]

Boda et al.

[11] Patent Number: 4,709,596

[45] Date of Patent: Dec. 1, 1987

[54] CONTROL OF A VEHICLE AUTOMATIC TRANSMISSION

[75] Inventors: Keiji Boda, Hiroshima; Kouichirou Waki, Mihara; Keizo Yanagisawa, Fuji, all of Japan

[73] Assignees: Mazda Motor Corporation, Hiroshima; Japan Automatic Transmission Co., Ltd., Fuji, both of Japan

[21] Appl. No.: 925,244

[22] Filed: Oct. 30, 1986

[30] Foreign Application Priority Data

| Oct. 31, 1985 | [JP] | Japan | 60-244840 |
| Oct. 31, 1985 | [JP] | Japan | 60-244841 |
| Oct. 31, 1985 | [JP] | Japan | 60-244842 |
| Oct. 31, 1985 | [JP] | Japan | 60-244843 |
| Oct. 31, 1985 | [JP] | Japan | 60-244844 |

[51] Int. Cl.$^4$ .................. B06K 41/18; B06K 41/16
[52] U.S. Cl. .................................. 74/868; 74/866
[58] Field of Search ...................... 74/866, 868, 869

[56] References Cited

U.S. PATENT DOCUMENTS

| 4,188,839 | 2/1980 | Kubo et al. | 74/869 |
| 4,334,441 | 6/1982 | Iwanaga et al. | 74/869 X |
| 4,351,206 | 9/1982 | Lemieux et al. | 74/866 |
| 4,476,747 | 10/1984 | Kawamoto | 74/869 |
| 4,531,432 | 7/1985 | Inagaki et al. | 74/866 |
| 4,662,247 | 5/1987 | Sotoyama et al. | 74/866 |

FOREIGN PATENT DOCUMENTS 56-156543 12/1981 Japan.
183160 10/1984 Japan.

Primary Examiner—Leslie Braun
Assistant Examiner—Wright
Attorney, Agent, or Firm—Fleit, Jacobson, Cohn & Price

[57] ABSTRACT

A vehicle automatic transmission having a torque converter and a multiple stage transmission gear mechanism connected with the torque converter. The gear stage of the gear mechanism is selected in accordance with the vehicle operating condition. The transmission includes friction members. One of the friction members is engaged for a higher gear stage and disengaged for a lower gear stage whereas the other is disengaged for the higher gear stage and engaged for the lower gear stage. In shifting down from the higher gear stage to the lower gear stage, the other friction member is engaged after a predetermined time from the disengagement of the one friction member.

17 Claims, 21 Drawing Figures

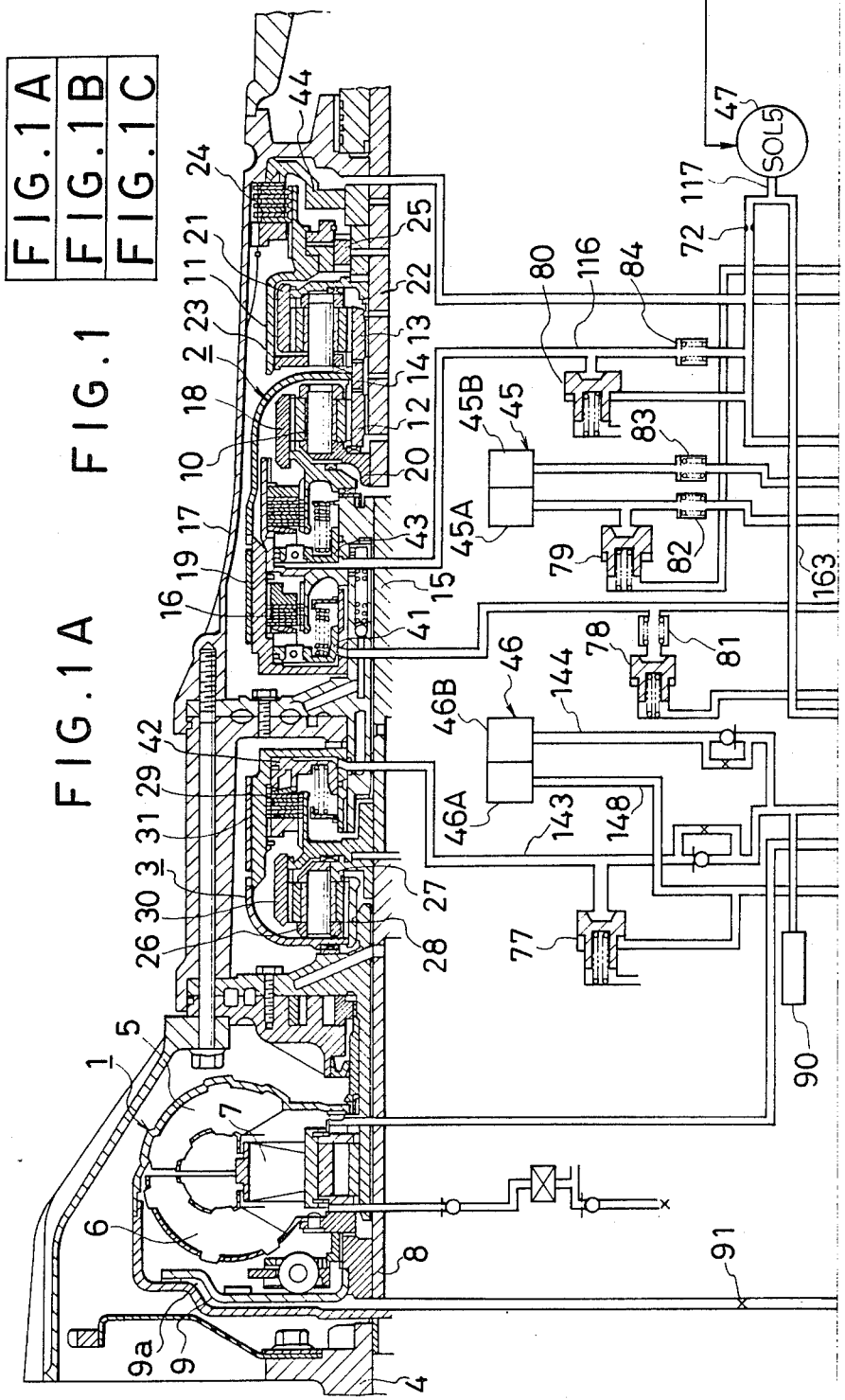

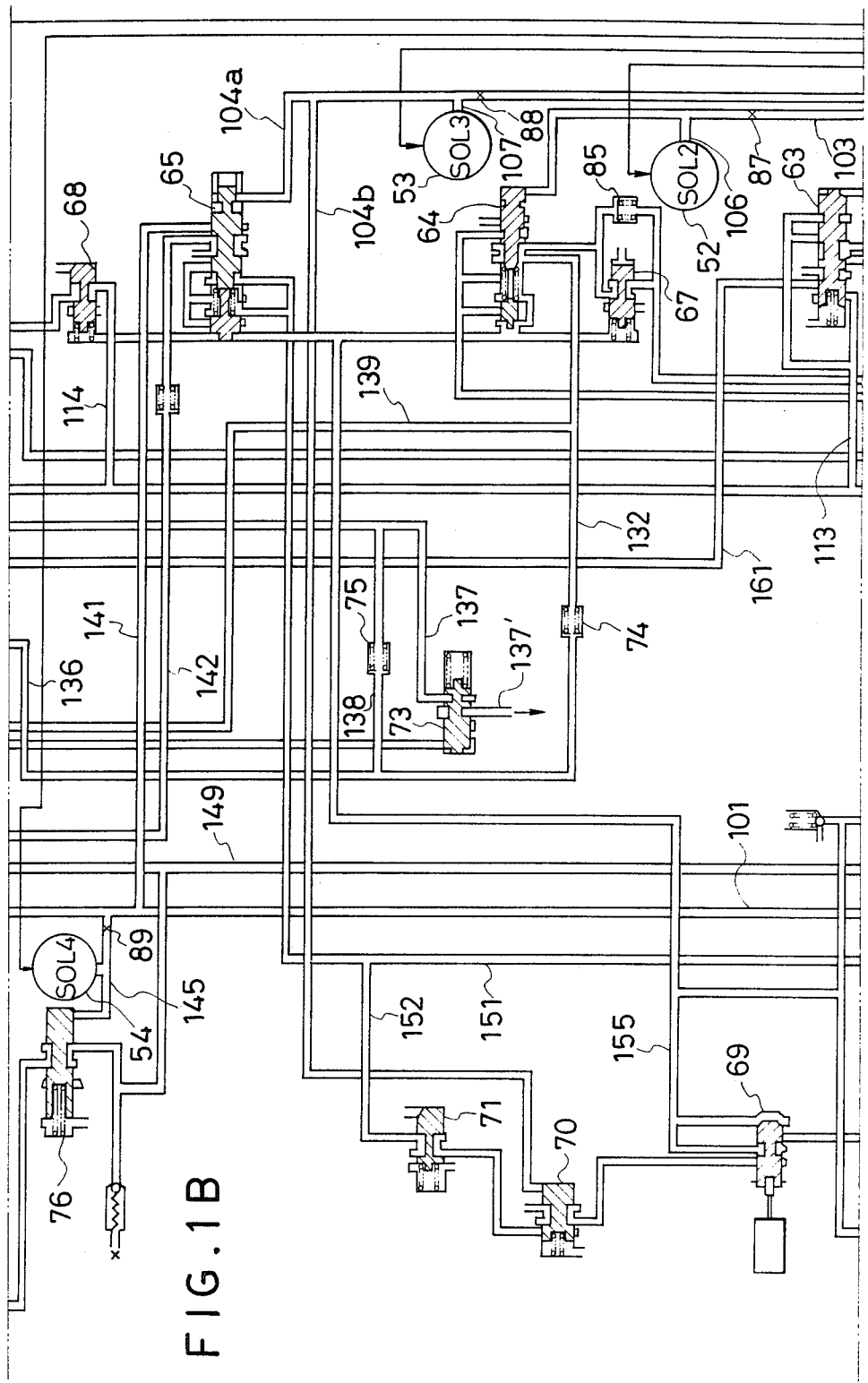

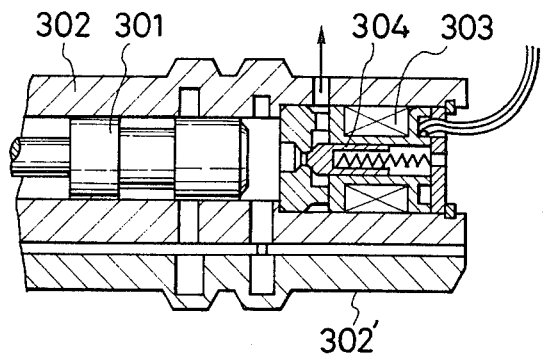
FIG.5
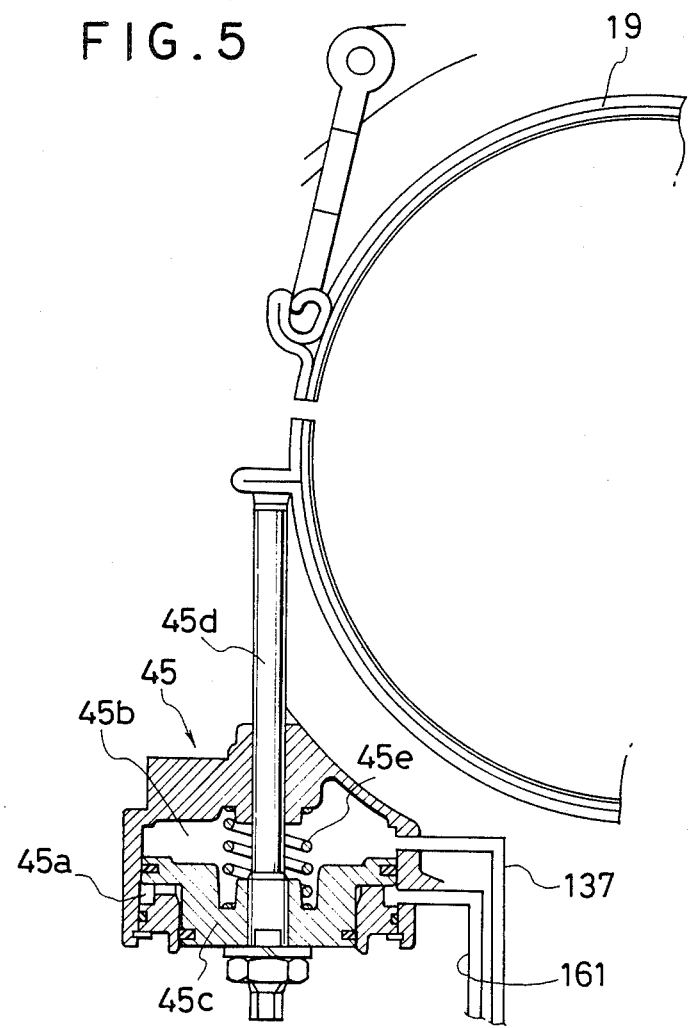

CONTROL OF A VEHICLE AUTOMATIC TRANSMISSION

BACKGROUND OF THE INVENTION

1. Field of the Invention

The present invention relates to a vehicle automatic transmission, and more particularly to a control of a vehicle automatic transmission having a torque converter and a multiple stage transmission gear mechanism connected with the torque converter.

2. Description of the Prior Art

Conventional vehicle automatic transmissions having a torque converter anda multiple stage transmission gear mechanism connected to the torque converter include hydraulically actuated friction members for selecting one of the gear stages of the transmission gear mechanism in accordance with vehicle operating conditions. An example of such automatic transmission is shown in the Japanese patent application No. 55-61070 filed on May 7, 1980 and published for public inspection on Dec. 3, 1981 under the diclosure No. 56-156543. In this automatic transmission, two friction members are oppositely actuated to select two adjacent gear stages. For example, under an operation in D-range, the third gear stage is obtained by having one of the clutches engaged and one of the brakes released but the second gear stage is obtained by having the one clutch disengaged and the one brake engaged. In order to operate the clutch and the brake in the opposite direction by the hydraulic pressure supplied through a common fluid line, the clutch is of a type wherein it is normally engaged but disengaged under a hydraulic pressure whereas the brake is of a type wherein it is normally released but engaged under the hydraulic pressure.

In an automatic transmission having the aforementioned control system, it is essential to determine the timings of the operations of the friction members because otherwise there will be produced uncomfortable gear shift shock. Speaking more specifically, when the transmission gear mechanism is shifted from a higher gear stage down to a lower gear stage, there will be an increase in the speed of the torque converter turbine by a value corresponding to the difference between the gear ratios of the higher gear stage and the lower gear stage as soon as the clutch is released. In order to accomplish a smooth shifting down, it is required to complete engagement of the brake when the torque converter turbine speed is increased by the value corresponding to the difference between the gear ratios of the higher and lower gear stages. It should however be noted that it is very difficult to control the operations of the clutch and the brake in a desirable manner throughout the vehicle operating conditions because the rate of the change of the turbine speed varies depending on the various vehicle operating conditions such as the engine speed. Thus, sometimes the vehicle speed, and the engine speed. Thus, sometimes the clutch may be engaged before the brake is sufficiently released producing a double-lock phenomenon by which the torque converter turbine speed is decreased than the value suitable for the higher gear stage. Conversely, if the timing of the engagement of the clutch is later than the ideal timing, the turbine speed will be increased beyond the value suitable for the lower gear stage producing a raising phenomenon.

The aforementioned Japanese patent publication proposes to solve the problem by providing a flow restriction in a passage for draining the line to the actuator for the brake so that the brake releasing pressure is relieved in a controlled manner. The proposed solution is considered as being effective in controlling the timings of the clutch and the brake in a desirable way. It should however be noted that even with this proposal, it would not be possible to obtain desired operating timings of the clutch and the brake. A further problem in this proposed arrangement is that the drain line is used in common for the clutch and the brake so that there will be produced changes in time period wherein the pressure is released and the shift shock will not be satisfactorily suppressed.

SUMMARY OF THE INVENTION

It is therefore an object of the present invention to provide a control system for a vehicle automatic transmission which is effective to suppress the shift shock caused by inappropriate operating timings of a plurality of friction members.

Another object of the present invention is to provide a control system for a vehicle automatic transmission in which a plurality of friction members are operated at desirable timings under a wide range of vehicle operation.

According to the present invention, in order to accomplish the above and other objects, there is provided a hydraulic circuit for controlling first friction means which is adapted to be engaged for a higher gear stage and disengaged for a lower gear stage, and second friction means which is adapted to be disengaged for the higher gear stage and engaged for the lower gear stage, the hydraulic circuit including timing valve means for providing a time delay for the engagement of the second friction means to shift the transmission gear mechanism from the higher gear stage down to the lower gear stage.

Thus, according to the present invention, there is provided a vehicle automatic transmission including a torque converter having an engine driven input member and an output member, a multiple stage transmission gear mechanism connected with the output member of the torque converter and having a plurality of gear stages of different gear ratios, gear stage selecting means including a plurality of friction means adapted to be actuated by hydraulic actuator means and valve means for controlling supply of hydraulic pressure to said actuator means, control means for operating said valve means in accordance with vehicle operating condition so that one of the gear stages is selected in accordance with a predetermined manner depending on the vehicle operating condition, said gear stages including at least a higher gear stage and a lower gear stage, said gear stage selecting means including first friction means adapted to be engaged for the higher gear stage and disengaged for the lower gear stage and second friction means adapted to be disengaged for the higher gear stage and engaged for the lower gear stage, first actuating means normally holding said first friction means in a disengaged position and operated by a hydraulic pressure to move said first friction means to an engaged position, second actuating means normally holding said second friction means in an engaged position and operated by a hydraulic pressure to move said second friction means to a disengaged position, first fluid passage means leading to said first actuator means for supplying the hydraulic pressure to the first actuator means, second fluid passage means branched from the first fluid passage means for supplying the hydraulic pressure to the second actuator means, said valve means including shift valve means provided in said first fluid passage means at a point remote from the first actuator means than a point where the second fluid passage means is branched from the first passage means, said shift valve means having first position wherein the first fluid passage means is opened to a source of hydraulic pressure and a second position wherein the first fluid passage means leading to the first actuator means and the second fluid passage means is drained, timing valve means provided in said second passage means and a having first position making it possible to supply a hydraulic pressure from said first fluid passage means through said second fluid passage means to said second actuator means and a second position for draining said second actuator means, said control circuit means including means for producing a first signal for moving the shift valve means to said second position and a second signal for moving said timing valve means to said second position after a predetermined time from the first signal. The predetermined time may be changed in accordance with the vehicle operating condition so that a smooth gear shifting operations can be obtained in a wide range of the vehicle operation.

The above and other objects and features of the present invention will become apparent from the following descriptions of preferred embodiments taking reference to the accompanying drawings.

BRIEF DESCRIPTION OF THE DRAWINGS

FIG. 4 is a sectional view of a preferred structure of a solenoid valve; and,

FIG. 5 is a sectional view of a brake assembly.

DESCRIPTION OF THE PREFERRED EMBODIMENTS

Basic Structure of the Transmission

Figure 1C:
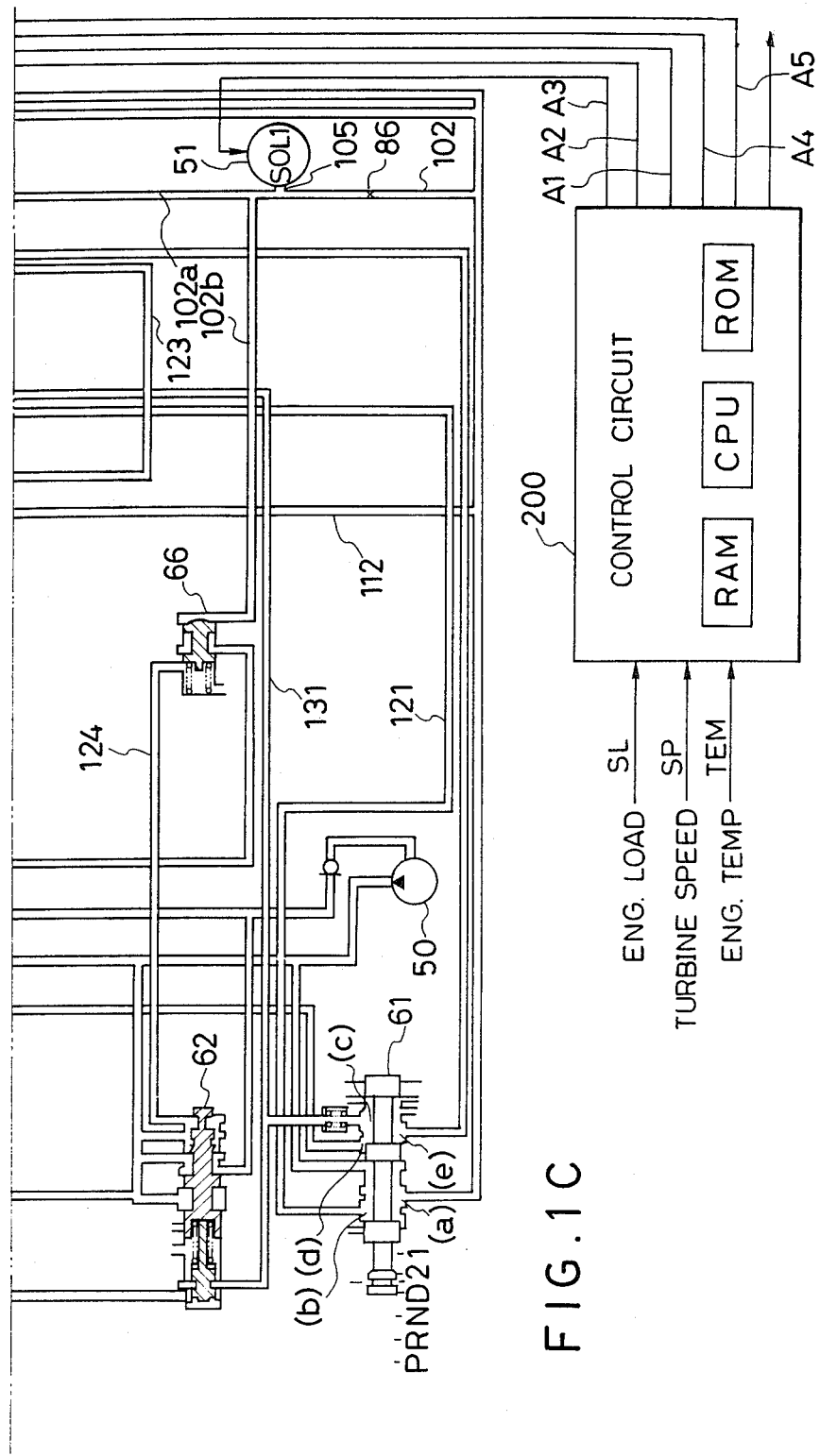
FIG. 1 is a diagrammatical illustration of a vehicle automatic transmission in accordance with one embodiment of the present invention.

Referring now to FIG. 1, there is shown an automatic transmission which comprises a hydraulic torque converter 1, a multiple stage transmission gear mechanism 2, and a planetary gear type over-drive transmission mechanism 3 arranged between the torque converter 1 and the multiple stage transmission gear mechanism 2.

The torque converter 1 has a pump 5 connected with an engine output shaft 4, a turbine 6 provided to face to the pump 5 and a stator 7 disposed between the pump 5 and the turbine 6. A converter output shaft 8 is connected with the turbine 6. A lock-up clutch 9 is provided between the converter output shaft 8 and the casing which is connected to the pump 5. The lock-up clutch 9 is normally engaged with the casing under a pressure of hydraulic fluid which circulates in the torque converter 1, and is released by a hydraulic pressure, which is drawn to a space between the casing and the clutch 9 from an external pressure source.

The multiple stage transmission gear mechanism 2 has a front planetary gear unit 10 and a rear planetary gear unit 11. The front planetary gear unit 10 has a sun gear 12 connected with a sun gear 13 of the rear planetary gear unit 11 though a connection rod 14. The gear mechanism 2 has an input shaft 15 connected through a front clutch 16 with the connecting rod 14 and through a rear clutch 17 with an internal gear 18 of the front planetary gear unit 10. A second brake 31 is provided between the connecting rod 14 or the sun gears 12, 13 of the gear units 10 and 11 and a casing of the transmission. The gear mechanism 2 also has an output shaft 22 connected with a planetary carrier 20 of the front planetary gear unit 10 and an internal gear 21 of the rear planetary carrier 23, and there are provided between the planetary carrier 23 and the transmission casing a lowneverse brake 24 and a one-way clutch 25.

The planetary gear type over-drive transmission mechanism 3 includes planetary gears 26, a planetary carrier 27 rotatably carrying the planetary gears 26 and connected with the output shaft 8 of the torque converter 1, a sun gear 28 engaged with the planetary gears 26, and an internal gear 30 which is also engaged with the planetary gears 26 and connected with the sun gear 28 through a direct connecting clutch 29. An over-drive brake 31 is provided between the sun gear 28 and the transmission casing. The internal gear 30 is connected with the input shaft 15 of the multiple stage transmission gear mechanism 2.

The multiple stage transmission gear mechamism 20 is of known type and can provide three forward driving gear stages and on reverse stage through selective engagements of the clutches and brakes. The relationships between the forward gear stages and the engagements of the clutches and brakes are shown in Table 1 together with typical values of gear ratios in the gear stages. The planetary gear type overdrive transmission mechanism 3 connects the shafts 8 and 15 directly when the direct connection clutch 29 is engaged and the brake 31 is released, and provides an over-drive connection between the shafts 8 and 15 when the brake 31 is engaged and the clutch 29 is released. This function is also shown in Table 1 together with typical values of the gear ratios.

TABLE 1

| SHIFT RANGES | | FRICTION MEMBERS | | | | | | | |
|---|---|---|---|---|---|---|---|---|---|
| | | REAR CLUTCH (17) | FRONT CLUTCH (16) | LOCK-UP CLUTCH(9) | DIRECT CLUTCH (29) | LOW-REVERSE BRAKE(24) | SECOND BRAKE(19) | OVERDRIVE BRAKE(31) | ONE-WAY CLUTCH(25) |
| | P | | | | O | | | | |
| | R | | O | | O | O | | | |
| | N | | | | O | | | | |
| D | 1st | O | | | O | | | | O |
| | 2nd | O | | O | O | | O | | |
| | 3rd | O | O | O | O | | | | |
| | 4th | O | O | O | | | | O | |
| | 2 | O | | | O | | O | | |
| 1 | 1st | O | | | O | O | | | |
| | 2nd | O | | | O | | | O | |

HYDRAULIC CONTROL CIRCUIT

The above-mentioned automatic transmission is provided with a hydraulic contol circuit as shown in FIG. 1. The hydraulic control circuit has an oil pump 50 which is driven by the engine output shaft. Hydraulic oil is discharged under pressure from the pump 50 into a pressure line 101. The oil pressure is reduced by a pressure regulating valve 62 and applied to a select valve 61. The select valve 61 has a plunger which can be selectively positioned by means of a shift lever in one of the shift positions 1, 2, D, N, R and P.

The manual valve 61 includes five ports a, b, c, d and e. The port a is communicated with the pressure line 101 when the plunger is in one of the positions D, 2 and 1. The port b communicates with the pressure line 101 in one of the positions D and 2. The port c is communicated with the pressure line 101 in the position R. The port d communicates with the pressure line 101 in one of the positions P, R, 2 and 1. The port e communicates with the pressure line 101 in one of the positions R and 1.

The port a is further connected with a line 111 which is branched at an end portion into a first pilot line 102, a second pilot line 103 and a third pilot line 104. The line 102 is provided with a 1-2 shift solenoid valve 51 for controlling the operation of a 1-2 shift valve 63 and a flow restriction 86. The line 103 is provided with a 2-3 shift solenoid valve 52 for controlling the operation of a 2-3 shift valve 64 and a flow restriction 87. The line 104 is provided with a 3-4 shift solenoid valve 53 for controlling the operation of a 3-4 shift valve 65 and a flow restriction 88. The solenoid valves 51, 52 and 53 function to close drain lines 105, 106 and 107 for the lines 102, 103 and 104, respectively, when energized to produce pilot pressures in the respective lines 102, 103 and 104. The pressures in the lines 102, 103 and 104 function to move the shift valves 63, 64 and 65 from right positions to left positions to effect shift operations. The relationship between the shift positions and the operations of the shift solenoid valves are shown in Table 2.

TABLE 2

| GEAR STAGE | 1-2 SHIFT SOLENOID VALVE | 2-3 SHIFT SOLENOID VALVE | 3-4 SHIFT SOLENOID VALVE |
|---|---|---|---|
| 1 | OFF | OFF | OFF(ON) |
| 2 | ON | OFF | OFF(ON) |
| 3 | ON | ON | OFF |
| 4 | ON | ON | ON |

It will be noted herein that the 3-4 shift solenoid valve 59 is deenergized in the 1st and 2nd stages under the D-range, however, it is energized in the 1st and 2nd stages under the 1 and 2-ranges as shown in brackets in the Table 2. This is because in the 1 and 2-range the pilot pressure is applied to the back-up control valve 70 from the 3-4 shift solenoid valve 59 as described later.

The first pilot line 102 is branched at a portion downstream the 1-2 shift solenoid valve 51 into a first branch line 102a which leads to a right end portion of the 1-2 shift valve 63 and a second branch line 102b which leads to a right end portion of a cut back valve 66.

The 1-2 shift valve 63 is applied at the opposite end portions with the line pressure through a line 112 branched from the line 111 and a line 113 branched further from the line 112. Further, the 1-2 shift valve 63 is applied at an intermediate portion with the line pressure through a line 112 which is in communication with the port e of the select valve 61. The line 122 is communicated with a line 123 when the 1-2 shift valve 63 is in the deenergized position, that is, in the 1st gear stage. The line 123 is connected with an actuator 44 for the low-reverse brake 24.

The line 113 is connected with a line 161 when the 1-2 shift valve 63 is energized, that is, in the gear stage other than the 1st stage. The line 161 is connected with an actuator 45 for the second brake 19. As shown in FIG. 5, the actuator 45 includes a piston 45c connected through a piston rod 45d with the brake band of the second brake 19. The piston 45c defines a brake applying chamber 45a and a brake releasing chamber 45b at the opposite sides thereof and biased into a brake releasing direction by a spring 45e. The line 161 is opened to the brake applying chamber 45a of the actuator 45. The line 161 is provided with an accmulator 79 and a one-way orifice 82. The back pressure of the accumulator 79 is controlled by a reducing valve 68.

The 2-3 shift valve 64 is operated by the pilot pressure introduced into the right end portion thereof through the line 103. The 2-3 shift valve 64 is connected with a line 121 leading from the port b of the manual valve 61 and with a line 131 leading from the port c of the manual valve 61.

The line 121 is communicated with a line 132 in the energized position of the 2-3 shift valve 64, that is, in the 3rd and 4th gear stages. The line 131 is communicated with the line 132 in the deenergized position of the 2-3 shift valve 64, that is, in the 1st and 2nd gear stages. The line 131 is provided with a reducing valve 67 and a one-way orifice 85 which are parallel with each other.

The line 132 is branched into a line 136 which is connected with an actuator 41 for the front clutch 16 and a line 138 which is connected with the releasing chamber 45b of the actuator 45 for the second brake 19. The line 132 is provided at a portion upstream the branched portion with a one-way orifice 74 which functions to apply a flow restriction to the flow directed to the branched portion.

The line 138 is provided at a portion immediately downstream the branched portion with a check valve 75 which functions to block the flow from the actuator 45 to the 2-3 shift valve 64. The line 138 is connected at a portion downstream the check valve 75 with a line 137 which is provided with a 3-2 timing valve 73.

The 3-2 timing valve 73 is adapted to be applied at a left end portion with a pilot pressure under which the spool of the valve 73 is shifted rightward to connect to line to a drain passage 137'. The pilot pressure chamber at the left end portion of the valve 73 is connected through a line 163 with the line 112. A flow restriction 72 is provided at the junction between the line 112 and the line 163. A drain line 117 is connected with the line 163 between the timing valve 73 and the flow restriction 72. The drain line 117 is provided with a solenoid valve 47 which is closed when energized to establish the pilot pressure in the line 163. The line 138 is provided at a portion downstream the junction between the lines 137 and 138 with a one-way orifice 83.

The line 136 is connected through a one-way orifice 81 with an accumulator 78 which is applied with a back pressure through a line branched from the line 132. The one-way orifice 81 functions to restrict the flow from the accumulator 78. The back pressure to the accumulator 78 is controlled by the aforementioned reducing valve 67.

The third pilot line 104 is branched at a portion downstream the 3-4 shift solenoid valve 53 into a first branch line 104a leading to a right end portion of the 3-4 shift valve 65 and a second branch line 104b leading to a pilot port of a back-up control valve which will be described later.

The 3-4 shift valve 65 is connected at an intermediate portion with a line 141 branched from the pressure line 101. The line 141 is connected with a line 142 in an unshifted position of the 3-4 shift valve 65, that is, in the gear stages other than the 4th stage. The line 142 is branched into a line 143 leading to an actuator 42 for the direct clutch 29 and a line 144 connected with an actuator 46 for the overdrive brake 31 at a brake releasing chamber 46B. A pressure switch 90 is provided in the line 142 at a portion upstream the branched portion. The line 143 is provided with an accumulator 77. The actuator 46 for the overdrive brake 46 has a brake engaging chamber 46A which is connected with the pressure line 101 through a line 148.

The 3-4 shift valve 65 is connected at a left end portion with a line 151 which is connected with a port d of the manual valve 61 so that the spool of the 3-4 shift valve 65 is maintained in the unshifted position in the select range other than the D-range by the line pressure introduced to the 3-4 shift valve 65 through the line 151. A line 152 is branched from the line 151 to lead to a vacuum throttle valve 69. The line 152 is provided with a throttle back-up valve 71 and a back-up control valve 70 which are arranged in series so that the valve 70 is in the upstream side.

The throttle back-up valve 71 functions to apply the line pressure in the line 152 to the vacuum throttle valve 69 in the 2 and 1 range to drive the pressure regulating valve 62 to increase the line pressure. The back-up control valve 70 is located between the throttle back-up valve 71 and the vacuum throttle valve 69 and functions to open the line 152 when a pressure is built up in the line 104b, that is, when the 3-4 shift solenoid valve 53 is energized. When the line 152 is opened in this manner, it becomes possible to increase the line pressue by the throttle back-up valve 71.

The line 112 is connected at a portion upstream the restriction 72 with a line 116 leading to an actuator 43 for the rear clutch 17. The line 116 is provided with an accumulator 80 and a one-way orifice 84. A line 114 is branched from the line 112 and provided with a reducing valve 68 for regulating the back pressure to the accumulator 79. The line 149 is connected with an actuating chamber 9a of the lock-up clutch through a line 146 provided with a lock-up valve 76 and a flow restriction 91. The lock-up valve 76 has a pilot line 145 provided with a flow restriction 89 and a lock-up solenoid valve 54. The lock-up clutch 9 is released when the lock-up solenoid valve 54 is energized to establish a pilot pressure in the line 145 to thereby move the spool of the lock-up valve 76 to a position wherein the lines 146 and 149 are connected together. In the illustrated embodiment, the lock-up clutch is engaged only in the 1st through 3rd gear stages.

CONTROL CIRCUIT

In order to make the aforementioned hydraulic circuit in an appropriate manner, there is provided an electronic control circuit 200 which may be made of a microprocessor having an I/O, RAM, ROM and CPU as well known in the art. The control circuit 200 is arranged to receive signals representing various vehicle operating conditions, such as an engine load signal from a load detector which detects for example the engine throttle valve position, and a torque converter turbine speed from a speed detector provided on the torque converter output shaft.

The CPU functions to judge the vehicle operating condition from these input signals and determines a gear stage in accordance with a predetermined procedure to produce appropriate output signals $A_1$, $A_2$, $A_3$, $A_4$ and $A_5$ which are applied to the solenoid valves 51, 52, 53, 54 and 47 in the hydraulic circuit. Thus, the friction members are actuated inaccordance with the pattern as shown in the Table 1.

According to the features of the present invention, the illustrated embodiment includes the timing solenoid valve 47 which is operated by the control signal $A_5$ to control the timing of engagement of the second brake 19 when a shift down is made from the 3rd gear stage to the 2nd gear stage so that a shift shock is suppressed.

OPERATIONS (3rd Gear Stage)

In this stage, the 1-2 shift solenoid valve 51 and the 2-3 shift solenoid valve 52 are both energized but the 3-4 shift solenoid valve 53 is deenergized. Thus, in the 1-2 shift valve 63, the line 113 is connected with the line 161 to apply the hydraulic pressure to the brake engaging chamber 45a of the actuator 45 for the second brake 19. In the 2-3 shift valve 64, the lines 121 and 132 are communicated so that the pressure is applied to the actuator 41 for the front clutch 16 and to the releasing chamber 45b of the second brake 19. Therefore, the front clutch 16 is engaged and the second brake 19 is released.

Since the line 123 is opened to the drain, the low-reverse brake 24 is released. Therefore, the engine brake function cannot be utilized. In the 3-4 shift valve 65, the lines 141 and 142 are connected together so that the direct clutch 29 is engaged. In the overdrive brake actuator 46, the pressure is introduced through the line 142 to the releasing chamber 46B so that the overdrive brake 31 is released.

In the line 112, there is the line pressure so that the rear clutch 17 is engaged. Thus, the transmission is in the 3rd gear stage. In this position, the line 151 is drained so that the throttle pressure is not applied to the vacuum throttle valve 69 even when the 3-4 shift solenoid valve 53 is energized and a pressure is established in the line 104b to shift the back-up control valve 70. (Shift Down to 2nd Gear Stage)

For the shift down, the 1-2 shift solenoid valve 51 is held in the energized position and the 3-4 shift solenoid valve 53 is held in the deenergized position. The control circuit 200 produces the signal $A_2$ to deenergize the 2–3 shift solenoid valve 52. Thus, in the 1–2 shift valve 63, the line 123 is communicated with the line 161 and the line 123 is drained to maintain the low-reverse brake 24 in the release position. In the 2–3 shift valve 64, the line 132 is drained through the line 131 so that the pressure to the actuator for the front clutch 16 is released to disengage the actuator for the front clutch 16 is released to disengage the clutch 16. The second brake 19 is still in the released position. As the result of the disengagement of the front clutch 16, the torque converter turbine speed starts to increase as shown in FIG. 2 (A).

Figure 2:
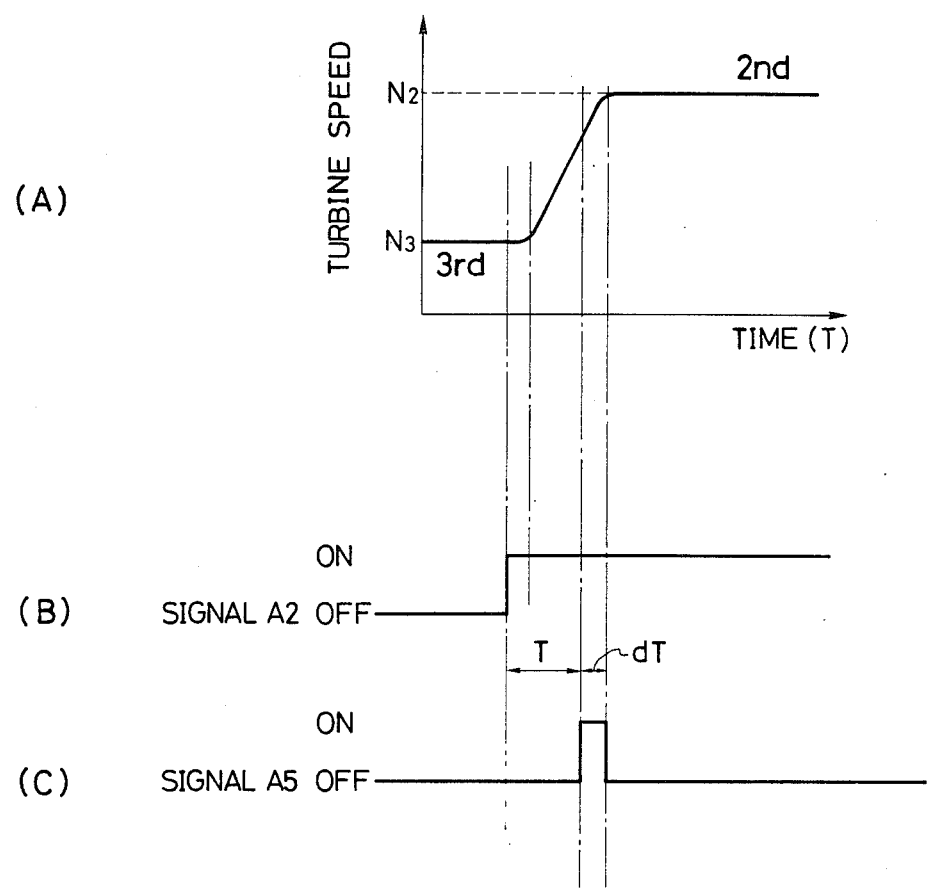
FIG. 2 is a diagram showing the valve operating timings in accordance with one mode of the present invention.

After a predetermined time T from the time when the signal $A_2$ is produced, the signal $A_5$ is produced as shown in FIG. 2 (C) so that the solenoid valve 47 is energized to apply the pressure to the 3–2 timing valve 73. Thus, the valve opens the line 137 to the drain passage 137′. As the result, the brake releasing pressure for the second brake 19 is relieved through the line 137, the valve 73 and the drain passage 137′. Therefore, the second brake 19 is engaged after a certain time dT from the start of the signal $A_5$, the time being required to have the brake releasing pressure completely relieved. Thereafter, the signal $A_5$ becomes OFF.

The pressure in the brake releasing chamber 45b of the actuator 45 is made quickly through the drain passage 137′ so that the variation of the time dT is very small. Therefore, by determining the time T so that the engagement of the second brake is completed when the torque converter turbine speed is increased from the value $N_3$ to the value $N_2$, it is possible to carry out the shift down without producing any shift shock. In the shift down operation, the direct clutch 29 and the rear clutch 17 are both engaged. Thus, the 2nd gear stage is established.

In a preferable mode, the time required for the increase of the turbine speed from the value $N_3$ to the value $N_2$ in shift down operations from the 3rd stage to the 2nd stage is in advance obtained for various vehicle operating conditions and the value T is calculated and stored in the ROM. In FIG. 4, there is shown a typical structure of the solenoid valve which can be used as the valves 47, 51 through 54. The valve includes a valve housing 302 receiving a valve spool 301 for axial sliding movement. In the housing, there is provided a solenoid coil 303 and a movable core 304 which are coaxial with the valve spool 301. These solenoid coil 303 and the core 304 are located in an extension 302′ of the housing 302. The structure of the solenoid valve is considered as being advantageous in that the valve structure becomes compact.

Figure 3:
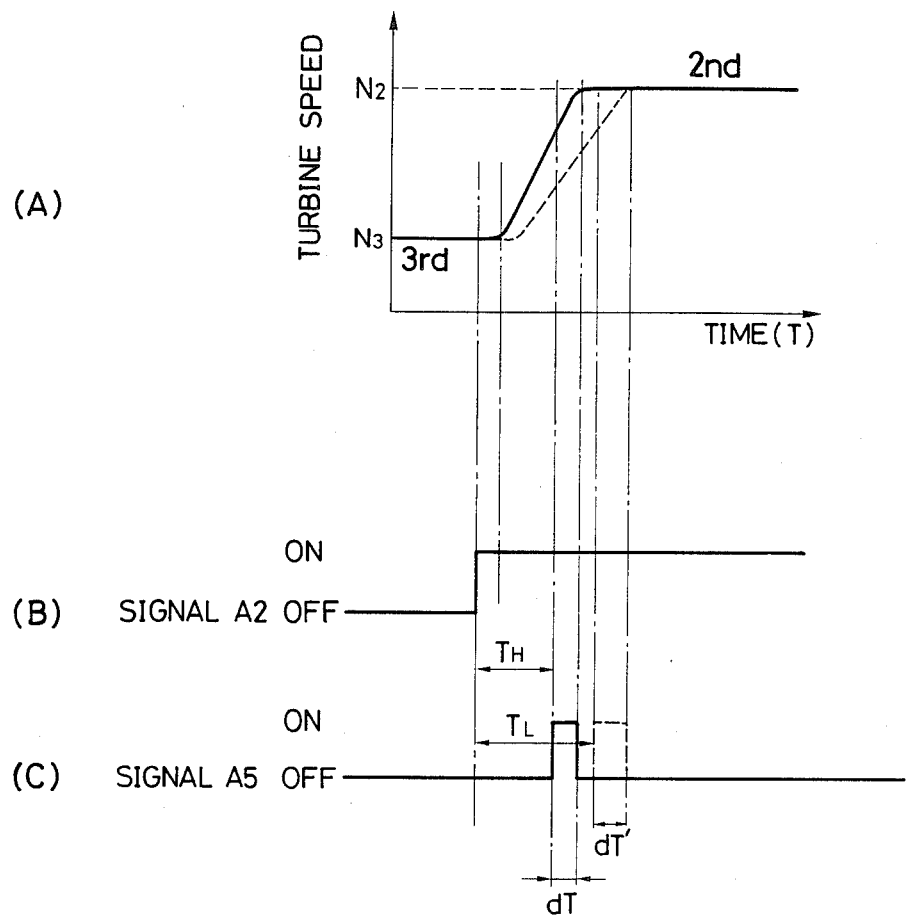
FIG. 3 is a diagram showing the valve operating timings in accordance with another mode of the present invention.
Figure 3:
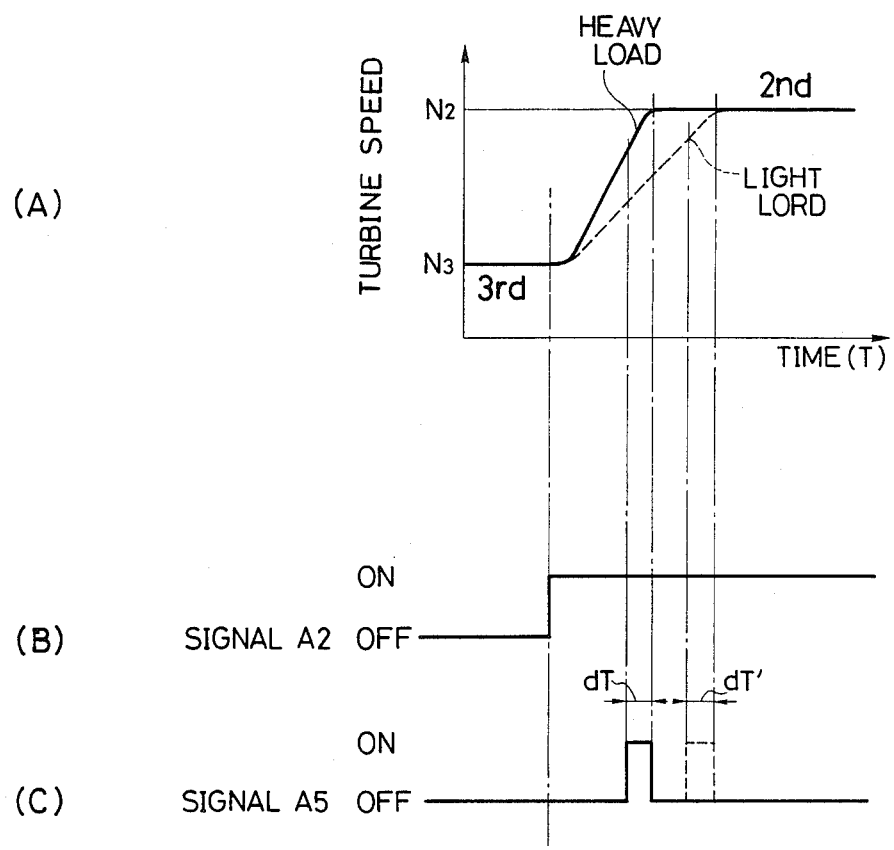
Figure 3:
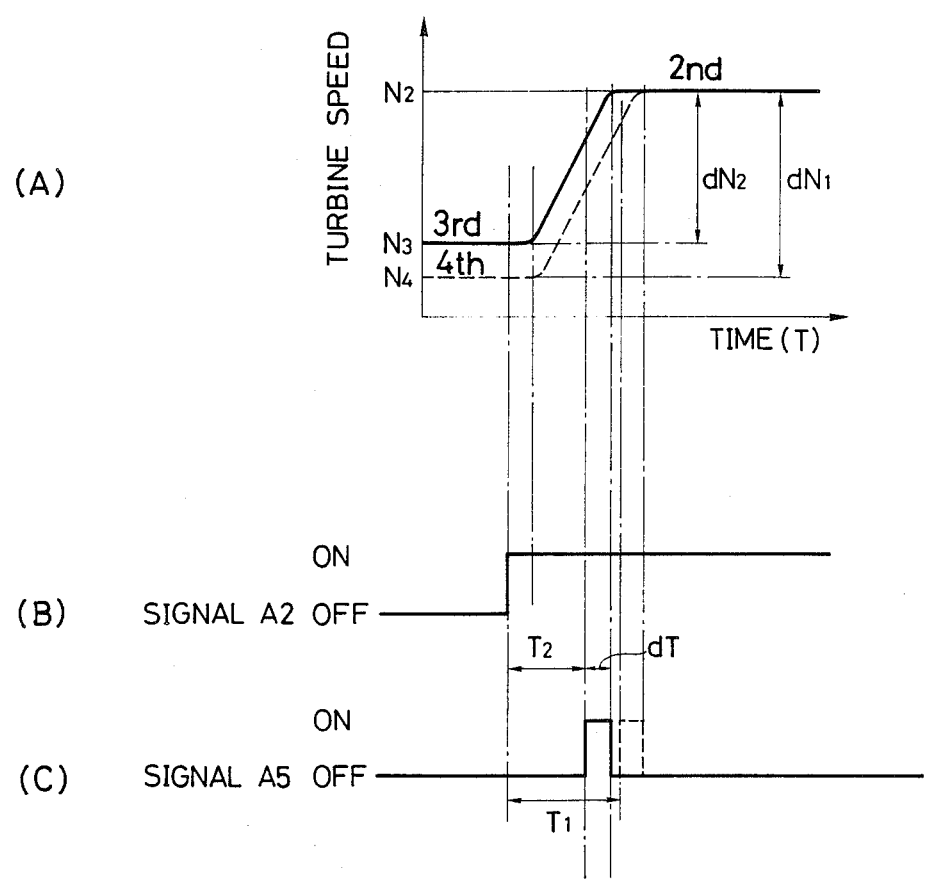
Figure 3:
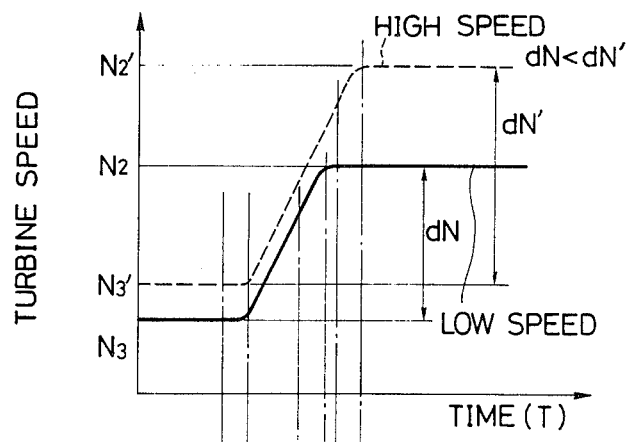

In the example shown in FIG. 3(1), the time T when the signal $A_5$ is produced is controlled so as to be changed in accordance with the engine temperature or hydraulic fluid temperature. It should be noted that the viscosity of the hydraulic fluid is increased as the temperature of the fluid is decreased causing an increase of the time to finish draining. The illustrated control takes account of this phenomenon so that the time T becomes long as the hydraulic fluid temperature is reduced. Basically, the hydraulic fluid temperature corresponds to the engine temperature. Therefore, the control circuit receives an engine temperature signal from a temperature detector which detects for example the temperature of the engine cooling liquid as shown in FIG. 1. As shown in FIG. 3 (B) and (C), the time $T_H$ for a higher engine temperature is shorter than the time $T_L$ for the lower engine temperature. Additionally, the variation time dT in a higher engine temperature is shorter than a variation time dT′ in a lower engine temperature because of the change in the viscosity of the hydraulic fluid. Accordingly, the time T and dT are determined in such a manner that the shift operation can be finished without producing any shift shock irrespective of the change in the hydraulic temperature.

Similarly, the engine load affects the time T wherein the time T becomes long as the engine load is decreased. Therefore, in an example as shown in FIG. 3(2), in order to eliminate the shift shock, the time T is changed in accordance with the engine load in such a manner that the time is shorter for a higher engine load than for a higher engine load.

In the aforementioned embodiment, the description is made with respect only to the shift down from the 3rd gear stage to the 2nd gear stage. However, the invention can be applied to any shift down control. In case where the present invention is applied to two or more shift down control for example to a shift down from the 4th gear stage to the 2nd gear stage as well as the shift down from the 3rd gear stage to the 2nd gear stage. In that case, the time T may be changed depending on the gear stage from which the shift down is made. As shown in FIG. 3(3), the engine speed difference $dN_1$ between the fourth and second stages is bigger than the difference $dN_2$ between the third and second stages so that the time $T_1$ in the shift down from the fourth to second stages is longer than the time $T_2$ in the shift down from the third to second stages. The time T further is changed in accordance with the vehicle speed. As shown in FIG. 3(4)(A), the engine speed difference dN′ in a higher vehicle speed is bigger than the difference dN in a lower vehicle speed so that the time $T_1$ in the higher vehicle speed is longer than the time $T_2$ in the lower vehicle speed.

The invention has thus been shown and described with reference to a specific embodiment, however, it should be noted that the invention is in no way limited to the details of the illustrated structures but changes and modifications may be made without departing from the scope of the appended claims.

We claim:

1. A vehicle automatic transmission including a torque converter having an engine driven input member and an output member, a multiple stage transmission gear mechanism connected with the output member of the torque converter and having a plurality of gear stages of different gear ratios, gear stage selecting means including a plurality of friction means adapted to be actuated by hydraulic actuator means and valve means for controlling supply of hydraulic pressure to said actuator means, control circuit means for operating said valve means in accordance with vehicle operating condition so that one of the gear stages is selected in accordance with a predetermined manner depending on the vehicle operating condition, said gear stages including at least a higher gear stage and a lower gear stage, said gear stage selecting means including first friction means adapted to be engaged for the higher gear stage and disengaged for the lower gear stage and second friction means adapted to be disengaged for the higher gear stage and engaged for the lower gear stage, first actuating means normally holding said first friction means in a disengaged position and operated by a hydraulic pressure to move said first friction means to an engaged position, second actuating means normally holding said second friction means in an engaged position and operated by a hydraulic pressure to move said second friction means to a disengaged position, first fluid passage means leading to said first actuator means for supplying the hydraulic pressure to the first actuator means, second fluid passage means branched from the first fluid passage means for supplying the hydraulic pressure to the second actuator means, said valve means including shift valve means provided in said first fluid passage means at a point further from the first actuator means than a point where the second fluid passage means is branched from the first passage means, said shift valve means having a first position wherein the first fluid passage means is opened to a source of hydraulic pressure and a second position wherein the first fluid passage means leading to the first actuator means and the second fluid passage means is drained, timing valve means provided in said second passage means and a having a first position making it possible to supply a hydraulic pressure from said first fluid passage means through said second fluid passage means to said second actuator means and a second position for draining said second actuator means, said control circuit means including means for producing a first signal for moving the shift valve means to said second position and a second signal for moving said timing valve means to said second position after a predetermined time from the first signal.

2. An automatic transmission in accordance with claim 1 in which said first friction means is clutch means adapted to be engaged for a third gear stage and released for a second gear stage, said second friction means being brake means adapted to be engaged for the second gear stage and released for the third gear stage.

3. An automatic transmission in accordance with claim 2 in which said shift valve means is a 2-3 shift valve for governing shift operations between the second and third gear stages.

4. An automatic transmission in accordance with claim 1 in which said second actuator means is a double acting actuator including a piston connected with the second friction means for actuating the same, an engaging chamber for providing a pressure which forces the second friction means in an engaging direction and a releasing chamber for providing a pressure which forces the second friction means in a releasing direction.

5. An automatic transmission in accordance with claim 1 in which said second fluid passage means is provided with orifice means for restricting at least a flow from the second actuator means to the first actuator means.

6. An automatic transmission in accordance with claim 1 in which said timing valve means is provided with solenoid valve means adapted to be energized by a signal from said control circuit means to operate the timing valve means.

7. An automatic transmission in accordance with claim 6 in which said shift valve means is provided with solenoid valve means adapted to be energized by a signal to operate the shift valve means.

8. An automatic transmission in accordance with claim 1 in which said control circuit means includes means for providing different values for the predetermined time in accordance with vehicle engine temperature.

9. An automatic transmission in accordance with claim 1 in which said control circuit means includes means for providing different values for the predetermined time in accordance with vehicle engine load.

10. An automatic transmission in accordance with claim 1 in which said control circuit means includes means for providing different values for the predetermined time in accordance with the gear stage which has been selected when the shift down is carried out.

11. An automatic transmission in accordance with claim 1 in which said control circuit means includes means for providing different values for the predetermined time in accordance with vehicle speed.

12. A vehicle automatic transmission including a torque converter having an engine driven input member and an output member, a multiple stage transmission gear mechanism connected with the output member of the torque converter and having a plurality of gear stages of different gear ratios, gear stage selecting means including a plurality of friction means adapted to be actuated by hydraulic pressure to said actuator means, control circuit means for operating said valve means in accordance with vehicle operating condition so that one of the gear stages is selected in accordance with a predetermined manner depending on the vehicle operating condition, said gear stages including at least a higher gear stage and a lower gear stage, said gear stage selecting means including first friction means adapted to be engaged for the higher gear stage and disengaged for the lower gear stage and second friction means adapted to be disengaged for the higher gear stage and engaged for the lower gear stage, first actuating means normally holding said first friction means in a disengaged position and operated by a hydraulic pressure to move said first friction means to an engaged position, second actuating means normally holding said second friction means in an engaged position and operated by a hydraulic pressure to move said second friction means to a disengaged position, first fluid passage means leading to said first actuator means for supplying the hydraulic pressure to the first actuator means, second fluid passage means branched from the first fluid passage means for supplying the hydraulic pressure to the second actuator means, said valve means including shift valve means provided in said first fluid passage means at a point further from the first actuator means than a point where the second fluid passage means is branched from the first passage means, said shift valve means having a first position wherein the first fluid passage means is opened to a source of hydraulic pressure and a second position wherein the first fluid passage means leading to the first actuator means and the second fluid passage means is drained, timing valve means provided in said second passage means and a having first position making it possible to supply a hydraulic pressure from said first fluid passage means through said second fluid passage means to said second actuator means and a second position for draining said second actuator means, said control circuit means including means for producing a first signal for moving the shift valve means to said second position and a second signal for moving said timing valve means to said second position after a predetermined time from the first signal, said shift valve means being provided with solenoid valve means adapted to be energized by a signal from the circuit means, said timing valve means being provided with solenoid valve means adapted to be energized by a signal from said control circuit means to operate the timing valve means, said control circuit means including detecting means for detecting vehicle operating condition and producing a vehicle operating condition signal by which the control circuit means provides a control signal.

13. An automatic transmission in accordance with claim 12 in which said detecting means is means for detecting vehicle engine temperature, said control circuit means including means for providing different values for the predetermined time in accordance with the vehicle engine temperature.

14. An automatic transmission in accordance with claim 12 in which said detecting means is an engine load detector, said control circuit means including means for providing different values for the predetermined time in accordance with vehicle engine load.

15. An automatic transmission in accordance with claim 12 in which said detecting means is gear stage detector, said control circuit means including means for providing different values for the predetermined time inaccordance with the gear stage which has been selected when the shift down is carried out.

16. An automatic transmission in accordance with claim 12 in which said detecting means is a vehicle speed detector, said control circuit means including means for providing different values for the predetermined time in accordance with vehicle speed.

17. An automatic transmission in accordance with claim 12 in which said detecting means includes vehicle engine temperature detector, an engine load detector, a gear stage detector and a vehicle speed detector, said controlcircuit means including means for providing different values for the predetermined time in accordance with the vehicle engine temperature, with vehicle engine load, with the gear stage which has been selected when the shift down is carried out, and with vehicle speed.

* * * * *